(12) United States Patent
Maeda et al.

(10) Patent No.: US 11,411,452 B2
(45) Date of Patent: Aug. 9, 2022

(54) COIL AND MOTOR USING SAME

(71) Applicant: Panasonic Intellectual Property Management Co., Ltd., Osaka (JP)

(72) Inventors: Yuya Maeda, Osaka (JP); Toshiyuki Tamamura, Osaka (JP); Mitsuoki Hishida, Osaka (JP); Kiyomi Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 17/041,019

(22) PCT Filed: Apr. 10, 2019

(86) PCT No.: PCT/JP2019/015538
§ 371 (c)(1),
(2) Date: Sep. 24, 2020

(87) PCT Pub. No.: WO2019/203076
PCT Pub. Date: Oct. 24, 2019

(65) Prior Publication Data
US 2021/0021167 A1    Jan. 21, 2021

(30) Foreign Application Priority Data
Apr. 18, 2018    (JP) .............................. JP2018-079731

(51) Int. Cl.
*H02K 3/18*    (2006.01)
*H02K 1/14*    (2006.01)
*H02K 3/46*    (2006.01)

(52) U.S. Cl.
CPC ................. *H02K 3/18* (2013.01); *H02K 1/14* (2013.01); *H02K 3/46* (2013.01)

(58) Field of Classification Search
CPC ...... H01F 27/2823; H02K 1/14; H02K 1/148; H02K 1/32; H02K 15/045; H02K 2203/09;
(Continued)

(56) References Cited

U.S. PATENT DOCUMENTS

| 2005/0035680 A1* | 2/2005 | Murakami | ............. | H02K 1/148 |
| | | | | 310/216.069 |
| 2008/0036323 A1* | 2/2008 | Georg | .................... | H02K 3/522 |
| | | | | 310/152 |
| 2021/0021167 A1* | 1/2021 | Maeda | ................ | H01F 27/2823 |

FOREIGN PATENT DOCUMENTS

| DE | 102012212637 | 1/2014 | | |
| EP | 3723104 A1 * | 10/2020 | ......... | H01F 27/2823 |

(Continued)

OTHER PUBLICATIONS

The Extended European Search Report dated Apr. 28, 2021, issued in counterpart EP Application No. 19788724.3. (10 pages).

(Continued)

*Primary Examiner* — Naishadh N Desai
(74) *Attorney, Agent, or Firm* — WHDA, LLP

(57) ABSTRACT

A coil is a coil of a conductive wire that has a quadrangular cross section, that is spirally wound and laminated to have a series of turns including first to n-th turns (n is an integer of 3 or more), and that is provided, on at least some of the first to n-th turns in the coil, with deformed portions representing recesses each having a shape different from a shape of another portion of the conductive wire. In each of the first and n-th turns respectively lying at both ends of the series of turns, an outer surface lying on a side opposite to a center of the series of turns extends flush along with a plane intersecting the series of turns.

11 Claims, 17 Drawing Sheets

(58) Field of Classification Search
CPC .. H02K 3/04; H02K 3/18; H02K 3/32; H02K 3/46

See application file for complete search history.

(56) References Cited

FOREIGN PATENT DOCUMENTS

| | | | | | |
|---|---|---|---|---|---|
| JP | 56-164654 | U | | 12/1981 | |
| JP | 56164654 | A | * | 12/1981 | ......... H04L 25/4902 |
| JP | S56-164656 | U | | 12/1981 | |
| JP | 2001-359250 | A | | 12/2001 | |
| JP | 4691275 | B2 | * | 6/2011 | ............... H01F 5/02 |
| JP | 2011-234443 | A | | 11/2011 | |
| JP | 2011234443 | A | * | 11/2011 | |
| JP | 5309595 | B | | 10/2013 | |
| JP | 2015-228476 | A | | 12/2015 | |
| JP | 2015228476 | A | * | 12/2015 | |
| JP | 2020137371 | A | * | 8/2020 | ............... H02K 3/04 |
| WO | 2003/041244 | | | 5/2003 | |

OTHER PUBLICATIONS

International Search Report of PCT application No. PCT/JP2019/015538 dated Jun. 25, 2019.

* cited by examiner

COIL AND MOTOR USING SAME

TECHNICAL FIELD

The present disclosure relates to a coil of a wound conductive wire having a rectangular cross section, and a motor using the coils.

BACKGROUND ART

Industry motors and on-vehicle motors have been highly demanded in recent years. In particular, a low cost but highly efficient motor has been demanded.

In one of methods of improving efficiency of a motor, coils respectively disposed in slots on a stator can reduce a loss due to eddy currents. With this configuration, it is possible to suppress a loss due to a current flowing into the coils while the motor is driven.

As a method of reducing an eddy current in a coil, such a conductive wire has been proposed that a cross section of aggregate conductive wires is separated into a plurality of regions (for example, see PTL 1).

The coil is spirally wound, in each of slots, around each of teeth provided on a stator. Strength of a magnetic field generated in a coil often changes each time an external current is supplied or a current is supplied externally. Along with this, such eddy currents as indicated by arrows A in FIG. 10 are induced in the coil. FIG. 10 is an explanatory diagram of eddy currents A generated in conventional coil 5. Depending on a size of a coil, resistivity of a material of the coil, or operating conditions for the coil, the coil generates more heat. A significant loss due to the generated heat would be problematic, such as lowered efficiency of a motor.

CITATION LIST

Patent Literature

PTL 1: Japanese Patent No. 5309595

SUMMARY OF THE INVENTION

The present disclosure has been made in view of such issues as described above. An object of the present disclosure is to achieve a coil capable of reducing an eddy current induced in a field magnet as an armature coil is energized, and of reducing a power loss due to an eddy current loss, as well as to achieve a motor using the coils.

To achieve the object described above, a coil according to the present disclosure is a coil of a conductive wire that has a quadrangular cross section, that is spirally wound and laminated to have a series of turns including first to n-th turns (n is an integer of 3 or more), and that is provided, on at least some of the first to n-th turns in the coil, with deformed portions representing recesses each having a shape different from a shape of another portion of the conductive wire. In each of the first and n-th turns respectively lying at both ends of the series of turns, an outer surface lying on a side opposite to a center of the series of turns extends flush along with a plane intersecting the series of turns.

In an ordinary coil, a loop of an eddy current is generated in each of straight portions of a conductive wire forming the coil, in each of axial directions or circumferential directions, in each of teeth. As this loop becomes greater in size, an eddy current loss increases. However, recesses on a conductive wire portion of the coil according to the present disclosure offer such effects that a loop of an eddy current generated in the conductive wire is reduced in size to reduce an eddy current loss.

The recesses provided, in each of the teeth, on the conductive wire extending longer in a Z-axis direction serving as a rotation axis of the motor are provided in both of the circumferential directions. The recesses on the conductive wire on a top side of the coil or a bottom side of the coil are provided in the Z-axis direction serving as the rotation axis of the motor. According to the configurations described above, it is possible to reduce an eddy current to be generated along each of coil axes. Furthermore, to provide a plurality of the recesses on portions, extending along one axis, of the conductive wire, providing the recesses alternately on each of straight portions of the conductive wire preferably shortens in length a loop of an eddy current to be generated in the conductive wire. Furthermore, since an eddy current would be more likely to be generated on a side adjacent to each of the teeth, i.e., on a side adjacent to a center of spiral rotation of the coil, it is preferable that more recesses be provided on an inside of the spirally formed coil. Furthermore, in a spirally formed coil structure, it can be expected that providing more recesses on a side adjacent to a rotation axis center of the motor achieve effects of efficiently reducing an eddy current.

The recesses being provided divide an eddy current generated in each of straight components of the conductive wire, leading to effects of reducing the eddy current. Therefore, it can be expected that providing more recesses achieve effects of reducing an eddy current loss. However, cutting out a conventional conductive wire would cause some portions of the conductive wire to have smaller cross-sectional areas with respect to a flow direction of a current. Therefore, resistance in the conductive wire increases, leading to greater Joule heat. Therefore, to provide the recesses, it is preferable to provide the recesses in a balanced manner between effects of reducing an eddy current and Joule heat due to an increase in resistance of the conductive wire.

A motor according to the present disclosure includes a stator including a stator core, teeth respectively protruding from the stator core, and the coils according to the present disclosure, which are respectively wound around the teeth.

As the configuration further reduces an eddy current loss in the coils, it is possible to suppress heat generation due to the eddy current loss, to reduce a loss in the coils, and to increase efficiency of the motor.

According to the present disclosure, an eddy current loss in the coils can be further reduced. A highly efficient motor can also be achieved.

DESCRIPTION OF EMBODIMENT

An exemplary embodiment will be described herein in detail with reference to the accompanying drawings. The preferable exemplary embodiment described below is essentially a mere example, and does not intend to limit the present invention, applications, and purposes.

Exemplary Embodiment

[About Motor Structure]

Figure 1A:
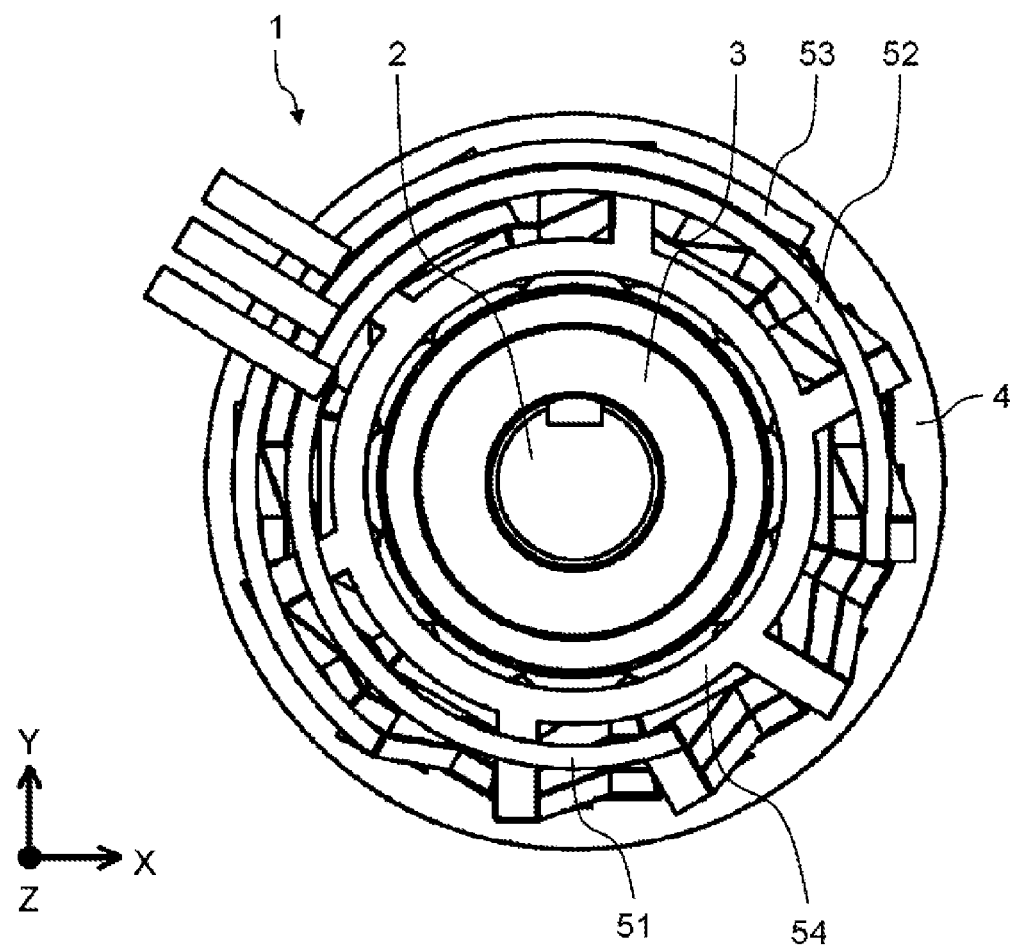
FIG. 1A is a top view illustrating a motor according to an exemplary embodiment.
Figure 1B:
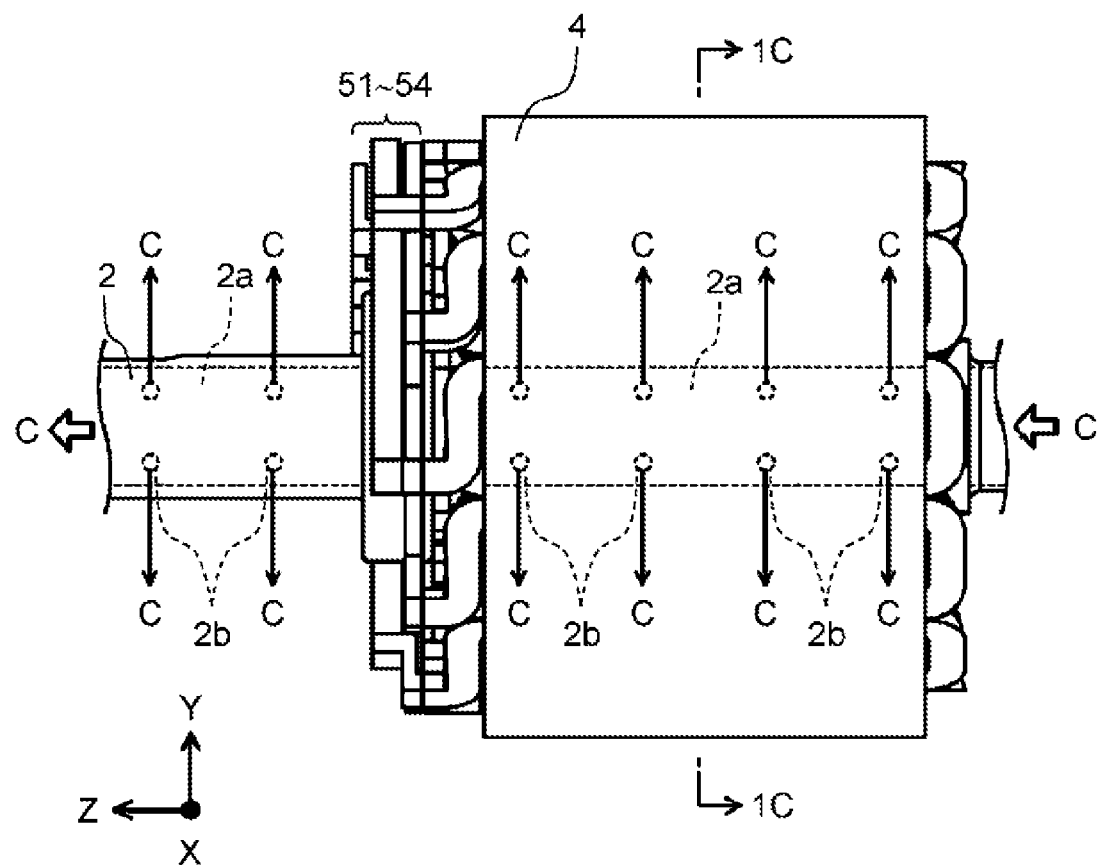
FIG. 1B is a side view illustrating the motor according to the exemplary embodiment.
Figure 1C:
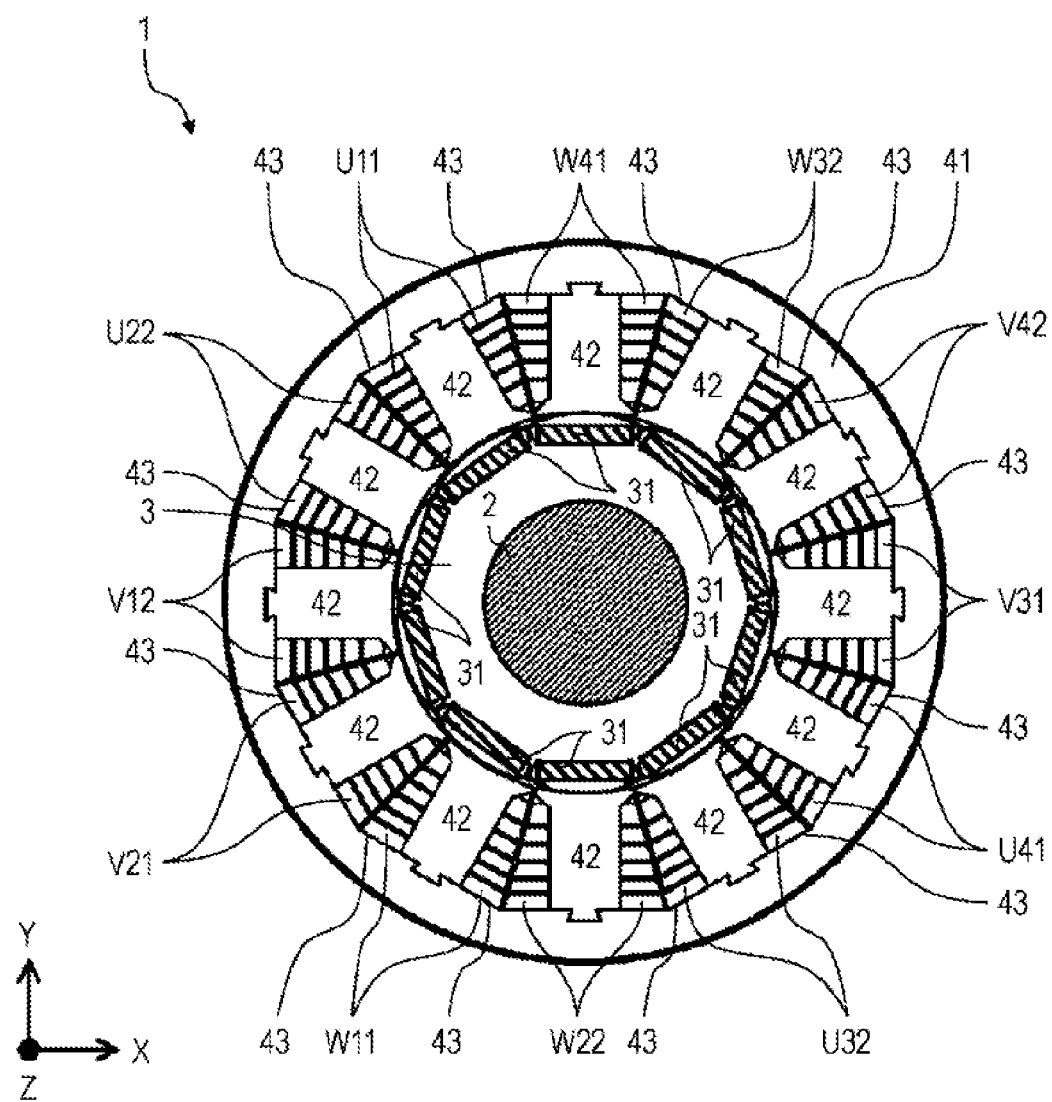
FIG. 1C is a cross-sectional view taken along line 1C-1C in FIG. 1B.

FIG. 1A is a top view illustrating motor 1 according to the exemplary embodiment. FIG. 1B is a side view illustrating motor 1 according to the exemplary embodiment. FIG. 1C is a cross-sectional view taken along line 1C-1C in FIG. 1B. However, the views do not illustrate a cover case, for example. Inside of the cover case (not illustrated), motor 1 includes shaft 2, rotor 3, stator 4, coils U11, U22, U32, U41, V12, V21, V31, V42, W11, W22, W32, and W41, and bus bars 51 to 54.

In here, a longer direction (a direction vertical to a paper plane of FIG. 1A) of shaft 2 may sometimes be referred to as a Z-axis direction. Directions orthogonal to the Z-axis direction (directions parallel to the paper plane of FIG. 1A) may sometimes be respectively referred to as an X-axis direction and a Y-axis direction. The X-axis direction and the Y-axis direction are orthogonal to each other.

A term "integrated" or "integrally" denotes a state of an object where not only a plurality of constituent parts are mechanically coupled with each other with bolts or through caulking, for example, but also a plurality of constituent parts are electrically coupled with each other through material coupling such as covalent coupling, ion coupling, or metal coupling, for example, or a plurality of constituent parts are electrically coupled with each other through material coupling after all of the constituent parts are melted.

Shaft 2 internally includes hollow portion 2a extending in the Z-axis direction. A plurality of through holes 2b are provided on a side surface of shaft 2. Hollow portion 2a serves as a passage for refrigerant C used to cool inside of motor 1. Refrigerant C flows inside of hollow portion 2a in the Z-axis direction to circulate and flow inside of motor 1. Some of refrigerant C flowing inside of hollow portion 2a flows from the plurality of through holes 2b outward from around a center of motor 1, i.e., flows from rotor 3 toward stator 4, to cool rotor 3 and stator 4.

Rotor 3 is provided to abut an outer circumference of shaft 2. Rotor 3 includes magnets 31 each facing stator 4. Magnets 31 respectively have N-poles and S-poles alternately disposed in an outer circumferential direction of shaft 2. In the present exemplary embodiment, neodymium magnets are used as magnets 31 used in rotor 3. However, its material, shape, and composition can be appropriately changed in accordance with an output of a motor, for example.

Stator 4 includes stator core 41 having a substantially annular shape, a plurality of teeth 42 provided on its inner circumference at equal intervals, and slots 43 respectively provided between teeth 42. When viewed in the Z-axis direction, stator 4 is disposed outside of rotor 3 to be away from rotor 3 at a certain gap.

Stator core 41 is die-cut and formed from electromagnetic steel sheets containing silicon, for example, and laminated to each other, for example.

In the present exemplary embodiment, rotor 3 includes a total of ten magnetic poles, including five N-poles and five S-poles facing stator 4. A number of slots 43 is 12. However, the present invention is not particularly limited to the numbers described above. A combination of another number of magnetic poles and another number of slots is also applicable.

Stator 4 includes 12 coils U11, U22, U32, U41, V12, V21, V31, V42, W11, W22, W32, and W41. The coils are attached to predetermined teeth 42, and are disposed in predetermined slots 43 when viewed in the Z-axis direction. That is, coils U11, U22, U32, U41, V12, V21, V31, V42, W11, W22, W32, and W41 are respectively wound in a concentrated manner with respect to teeth 42.

Furthermore, coils U11, U22, U32, and U41 are integrally disposed to bus bar 51, coils V12, V21, V31, and V42 are integrally disposed to bus bar 52, and coils W11, W22, W32, and W41 are integrally disposed to bus bar 53.

In each of symbols UXY, VXY, and WXY representing the coils, a first letter represents one of phases of motor 1 (one of U-phase, V-phase, and W-phase in the present exemplary embodiment). A second letter represents an order of arrangement of a corresponding one of the coils in the one of the phases. A third letter represents a winding direction of each of the coils. In the present exemplary embodiment, 1 represents a clockwise direction, whereas 2 represents a counterclockwise direction. Therefore, coil U11 represents a first coil in an order of arrangement in the U-phase, and a direction of winding is the clockwise direction. Coil V42 represents a fourth coil in an order of arrangement in the V-phase, and a direction of winding is the counterclockwise direction. A term "clockwise" denotes right-handed rotation when viewed from the center of motor 1. A term "counterclockwise" denotes left-handed rotation when viewed from the center of motor 1.

Specifically, coils U11, U41 are U-phase coils, whereas coils U22, U32 are U-bar-phase (a direction of a magnetic field is opposite to a direction of a magnetic field generated from a U-phase coil) coils. However, the coils will be collectively referred to as U-phase coils unless otherwise specified. Similarly, coils V12, V21, V31, and V42 and coils W11, W22, W32, and W41 will be respectively collectively referred to as V-phase coils and W-phase coils.

[About Coil Structure]

Figure 2:
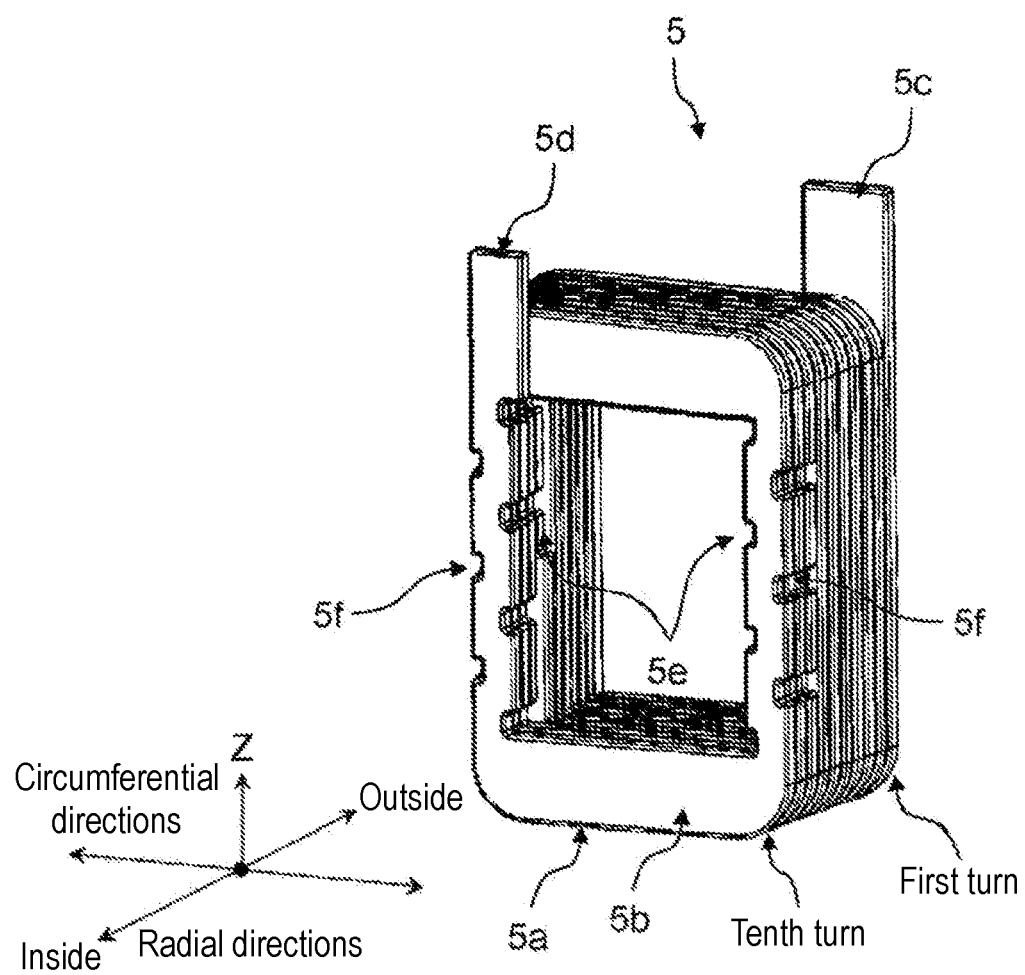
FIG. 2 is a perspective view illustrating a coil according to the exemplary embodiment.
Figure 3:
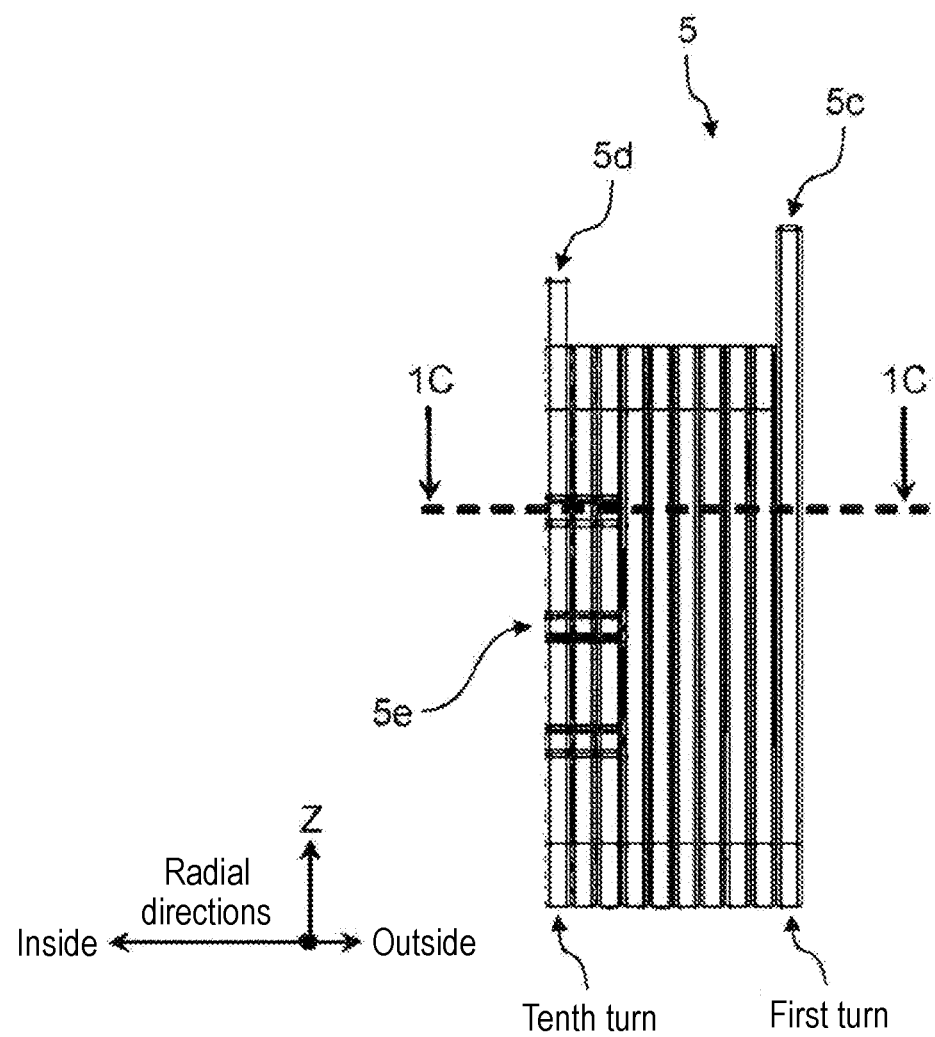
FIG. 3 is a side view illustrating the coil according to the exemplary embodiment.
Figure 4:
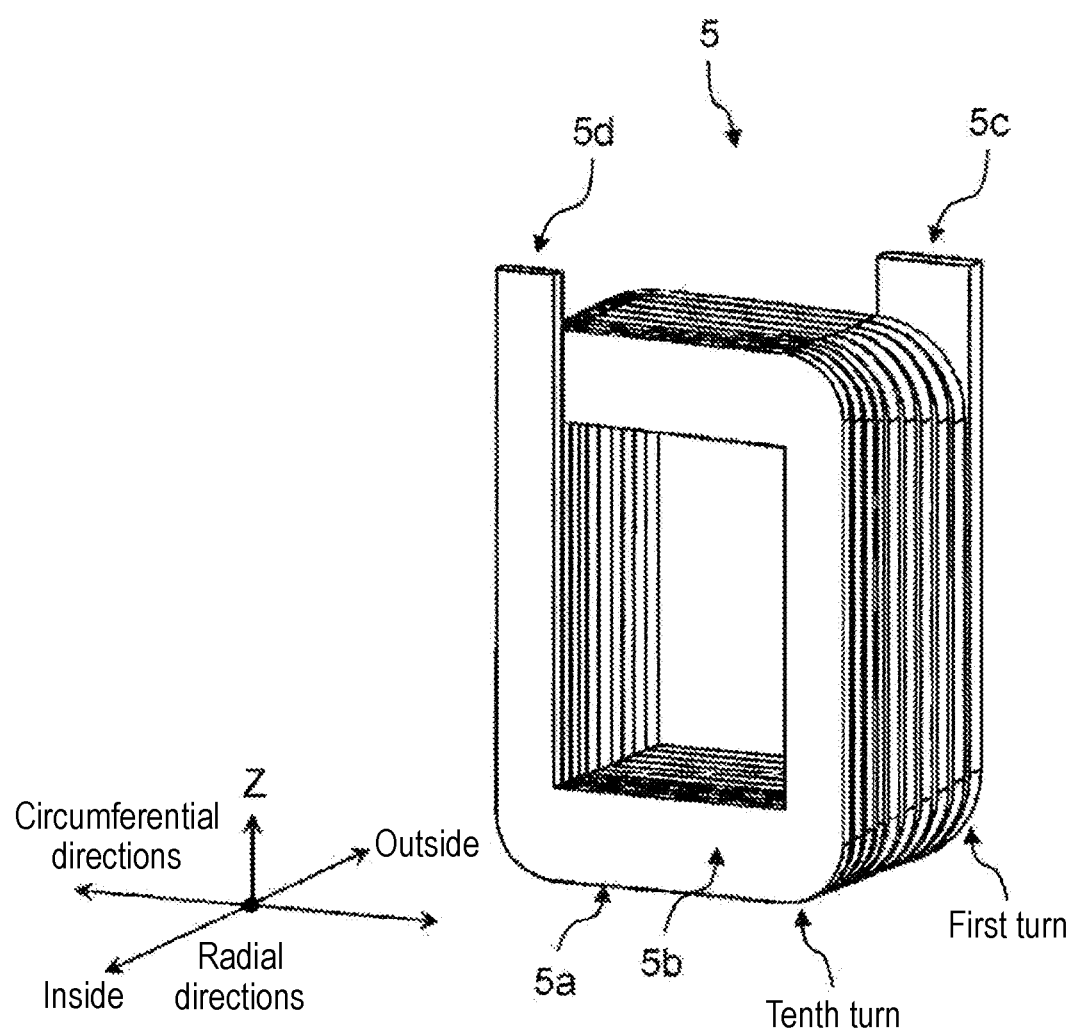
FIG. 4 is a perspective view illustrating a coil, for purpose of comparison with the exemplary embodiment.
Figure 5:
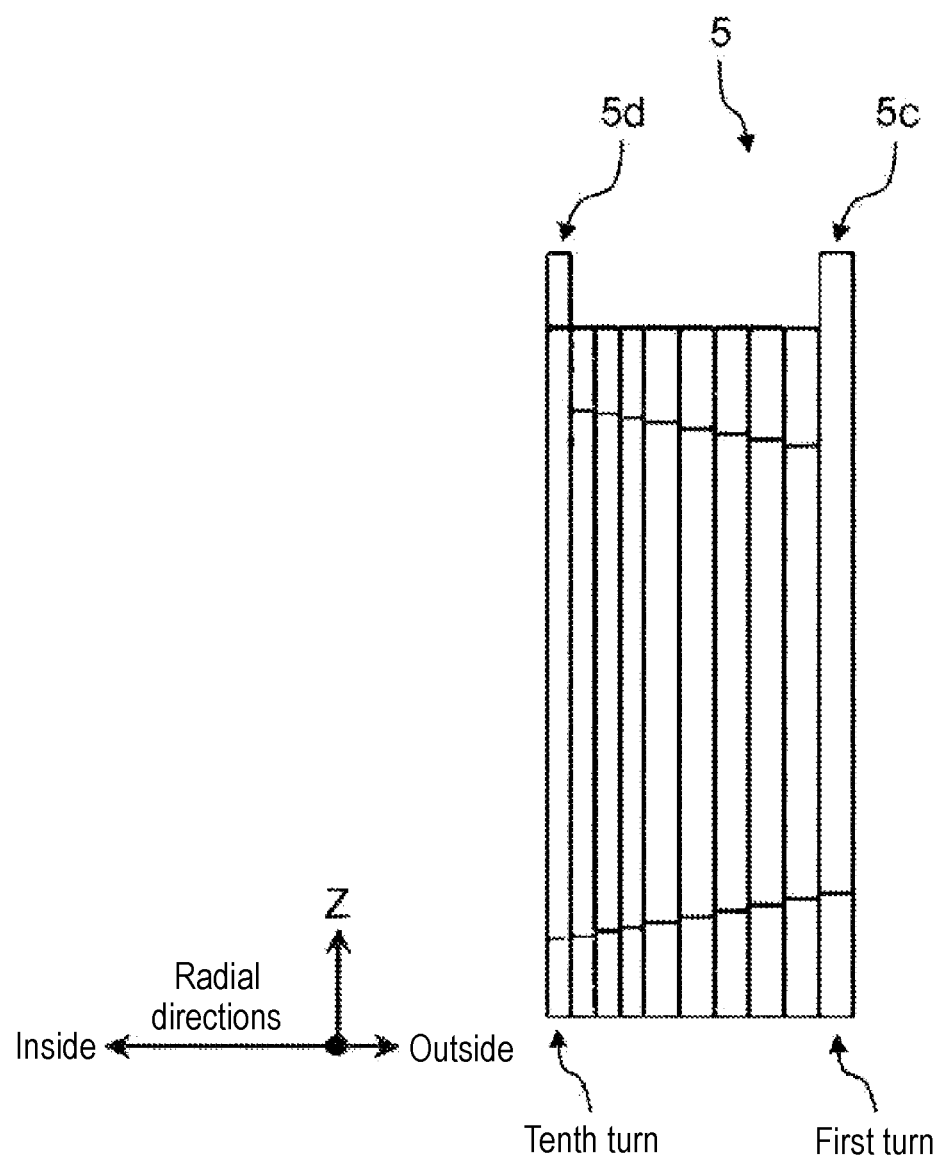
FIG. 5 is a side view illustrating the coil, for purpose of comparison with the exemplary embodiment.

FIG. 2 is a perspective view illustrating coil 5 according to the exemplary embodiment. FIG. 3 is a side view illustrating coil 5 according to the present exemplary embodiment. FIG. 4 is a perspective view illustrating coil 5, for purpose of comparison with the exemplary embodiment. FIG. 5 is a side view illustrating coil 5, for purpose of comparison with the exemplary embodiment. FIGS. 3 and 5 are the side views of coil 5 when viewed from a side in circumferential directions. Furthermore, coil 5 according to the present exemplary embodiment illustrated in FIGS. 2 and 3 includes coils U11, U22, U32, U41, V12, V21, V31, V42, W11, W22, W32, and W41 attached to teeth 42 of motor 1 illustrated in FIG. 1C.

Coil 5 includes conductive wire 5a being wound, insulation film 5b provided on a surface of conductive wire 5a, and extended portions 5c and 5d respectively extending from a first turn and a tenth turn of coil 5. A second turn to the tenth turn of coil 5 are wound in a rectangular shape in a plan view and each have four coil sides.

Conductive wire 5a is a wire material made of a conductive member having a rectangular cross section. Conductive wire 5a is spirally wound ten turns and laminated in upper and lower directions in a single layer to form a series of turns. Conductive wire 5a is made of, for example, copper, aluminum, zinc, magnesium, brass, iron, steel use stainless (SUS), for example.

Hereinafter, a portion where the conductive wire is wound from a tip of extended portion 5c to a position below a position where extended portion 5d is provided is referred to as the first turn. Subsequent portions, each of which the conductive wire is wound one turn, are counted as the second turn to the tenth turn. A desired starting point can be specified for each turn. A side where the first turn of coil 5 is provided may be referred to as "outside", whereas a side where the tenth turn is provided may be referred to as "inside". One reason for this is that outside of the motor is referred to as "outside", whereas a side of the center of the motor is referred to as "inside", with respect to a radial direction of a motor structure.

Insulation film 5b is provided wholly on the surface of conductive wire 5a to insulate coil 5 from an external member (not illustrated). In motor 1 illustrated in FIGS. 1A to 1C, for example, coils 5 are each insulated from stator core 41 and teeth 42 by insulation film 5b and an insulation member (not illustrated) such as insulation paper. Furthermore, the turns adjacent to each other in coil 5 are insulated by insulation film 5b. Insulation film 5b is made of, for example, polyimide, nylon, polyether ether ketone (PEEK), acrylic, amide imide, ester imide, enamel, or heat resistant resin, for example. A thickness of insulation film 5b is approximately several ten μm ranging, for example, from 10 μm to 50 μm inclusive.

Extended portions 5c and 5d each constitute portions of conductive wire 5a. Extended portions 5c and 5d respectively extend outward from side surfaces of coil 5, in other words, from planes intersecting the series of turns of conductive wire 5a to receive an externally supplied current or to supply a current externally. On extended portions 5c and 5d, insulation film 5b is removed to respectively couple with external members such as any of bus bars 51 to 54 illustrated in FIGS. 1A to 1C. It is not necessary that insulation film 5b be removed from whole areas of extended portions 5c and 5d. For example, insulation film 5b may be removed from at least portions necessary for coupling with bus bars 51 to 54.

Differences in shape between the coil, for purpose of comparison, and the coil according to the present exemplary embodiment will herein be described with reference to the accompanying drawings.

Figure 10:
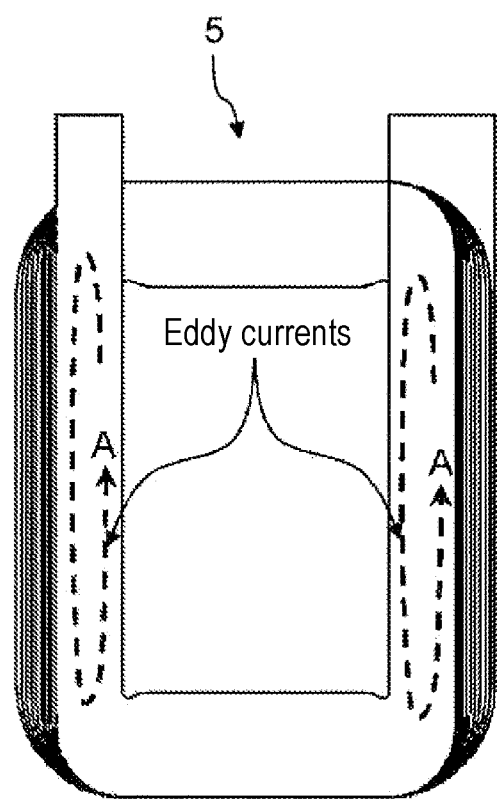
FIG. 10 is an explanatory diagram of eddy currents generated in a conventional coil.

In coil 5 illustrated in FIGS. 4 and 5, for purpose of comparison, eddy currents as illustrated in FIG. 10 are generated in each of straightforward portions of the turns of the conductive wire. The generated eddy currents lead to Joule heat causing a temperature of the motor to rise to lower efficiency of the motor.

In coil 5 according to the present exemplary embodiment, as illustrated in FIGS. 2 and 3, on the other hand, recesses 5e and 5f are provided in the circumferential directions, in each of teeth 42, on each of portions, which extend along axial directions of the turns, of the conductive wire. A size of each of recesses 5e and 5f being provided is approximately ⅓ of a width of the coil, an extent of which would not impair rigidity of the coil in its width. Recesses 5e and 5f are provided alternately in both of the circumferential directions of the coil. Recesses 5e and 5f may each be provided on a side in one of the circumferential directions of the coil. It is preferable that recesses 5e and 5f may be provided in both of directions inwardly toward one axis as illustrated in FIGS. 2 and 3 to allow loops of eddy currents to become further smaller. The size of each of recesses 5e and 5f that are cut out is not limited to approximately ⅓ of the width of the coil. Excluding concerns of a decrease in rigidity of the conductive wire and an increase in Joule heat due to an increase in resistance in the conductive wire, greater cut-outs offer higher effects of reducing eddy currents.

Figure 6:
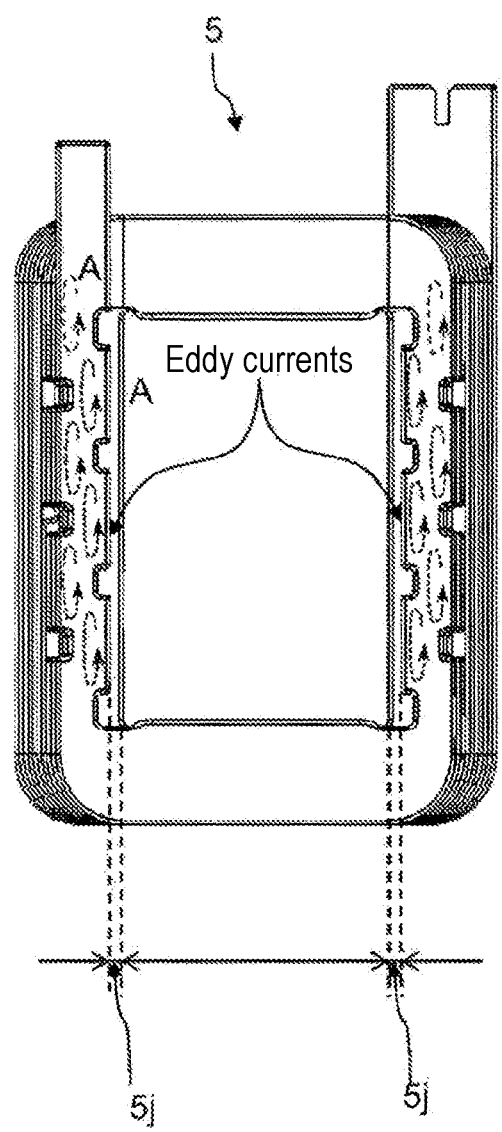
FIG. 6 is an explanatory diagram of eddy currents generated in the coil according to the exemplary embodiment.

FIG. 6 is an explanatory diagram of eddy currents generated in the coil according to the exemplary embodiment. In the conductive wire provided with recesses 5e and 5f illustrated in FIGS. 2 and 3, the eddy currents illustrated by arrows A in FIG. 6 are induced. The eddy currents illustrated in FIG. 6 are respectively smaller than eddy currents to be generated in a conventional coil.

A shape of each of recesses 5e and 5f illustrated in FIGS. 2 and 3 is a quadrangle. However, the shape may be, but not limited to, a triangle, a trapezoid, a circle, an inverted triangle, or an inverted trapezoid, for example. Furthermore, the shape may be an R-chamfered or C-chamfered polygonal shape, since a shape of each of corner portions greatly affects coil machining accuracy.

Recesses 5e and 5f illustrated in FIGS. 2 and 3 are provided, in each of the teeth, on portions, which extend along the axial directions of the turns, of the conductive wire. However, recesses 5e and 5f may be provided on, but not limited to, a conductive wire on a top side of a coil or a bottom side of a coil.

A number of the recesses being provided represents a natural number of 1 or greater. For example, to provide only one recess on a side, providing the recess on an inside of a coil offers higher effects of reducing an eddy current loss.

To provide an even number of recesses, i.e., to provide two or more recesses, alternately providing the recesses on sides identically in number in the circumferential directions of a coil offers higher effects of reducing an eddy current loss. One reason for this is that, if recesses are unevenly provided in number in the circumferential directions of a coil, a longer loop of an eddy current is generated on a side, where no recess is provided, of the coil, leading to less effects of reducing an eddy current loss.

To provide an odd number of recesses, i.e., to provide three or more recesses, providing more recesses on an inside, where each of teeth is present, of a coil, offers higher effects of reducing an eddy current loss. One reason for this is identical to the reason of a case where one recess is provided.

As described above, coil 5 according to the present exemplary embodiment is coil 5 of conductive wire 5a that has a quadrangular cross section, that is spirally wound and laminated to have a series of turns including first to n-th turns (n is an integer of 3 or more), and that is provided, on at least some of the first to n-th turns in coil 5, with deformed portions representing recesses each having a shape different from a shape of another portion of conductive wire 5a. In each of the first and n-th turns respectively lying at both ends of the series of turns, an outer surface lying on a side opposite to a center of the series of turns extends flush along with a plane intersecting the series of turns.

With this configuration, where an eddy current loss in coil 5 is further reduced, it is possible to suppress heat generation due to the eddy current loss, to reduce a loss in coil 5, and to increase efficiency of motor 1.

In the present exemplary embodiment, the number of turns in coil 5 has been specified to 10. However, the number of turns is not particularly limited to this number. Another number may be applied. That is, in a coil of a conductive wire that has a quadrangular cross section, and that is spirally wound and laminated in the radial directions to have a series of turns including first to n-th turns (n is an integer of 3 or more), recesses may not be provided on all of n turns, but may be provided on at least some of a plurality of turns. When recesses are provided, there are concerns of a decrease in cross-sectional area of a coil, an increase in coil conductivity, and an increase in Joule heat. Therefore, providing more recesses on an inside in the radial directions, which would be greatly affected by an eddy current loss, of a conductive wire, is more effective. Even when recesses are to be provided on some of such turns, it is preferable that the recesses be provided in consideration of balance between a reduction in rigidity of a coil and an increase in Joule heat due to an increase in resistance in a conductive wire.

Furthermore, the deformed portions may be provided at least on the nth turn.

Furthermore, the deformed portions may be provided, on the conductive wire, in the Z-axis direction representing a direction perpendicular to the radial directions and the circumferential directions of the coil, with recesses that are cut out in the circumferential directions of the conductive wire.

Furthermore, motor 1 according to the present exemplary embodiment includes rotor 3, and stator 4 including stator core 41, teeth 42 protruding from stator core 41, and coils 5 according to the exemplary embodiment, which are respectively wound around teeth 42.

(Modification Example 1)

Figure 7A:
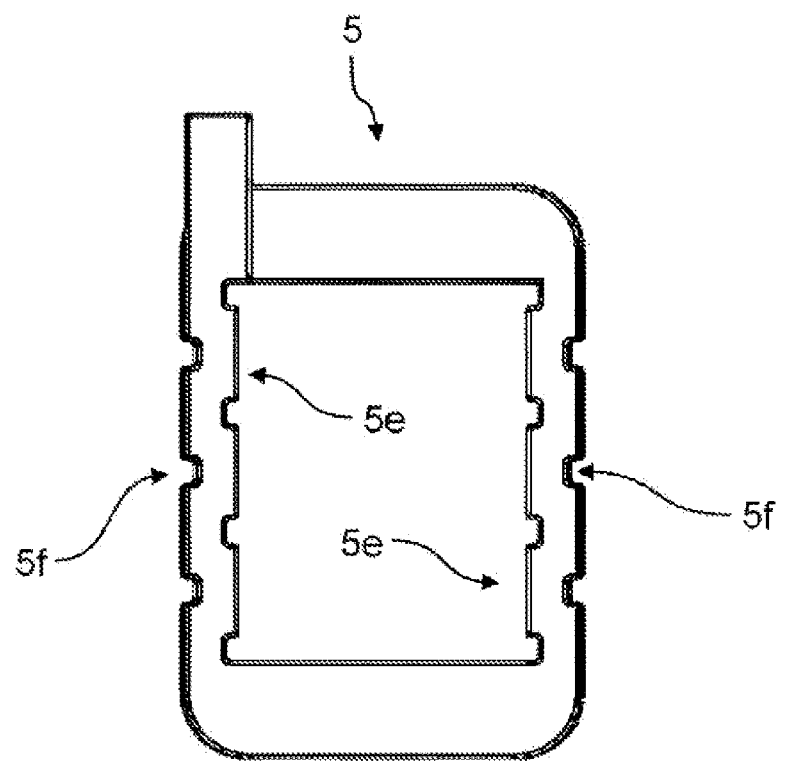
FIG. 7A is a front view illustrating the coil according to the exemplary embodiment.
Figure 7A:
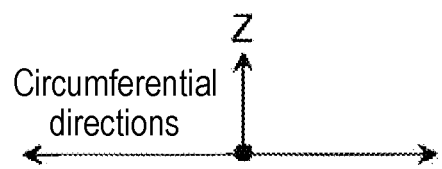
Figure 7B:
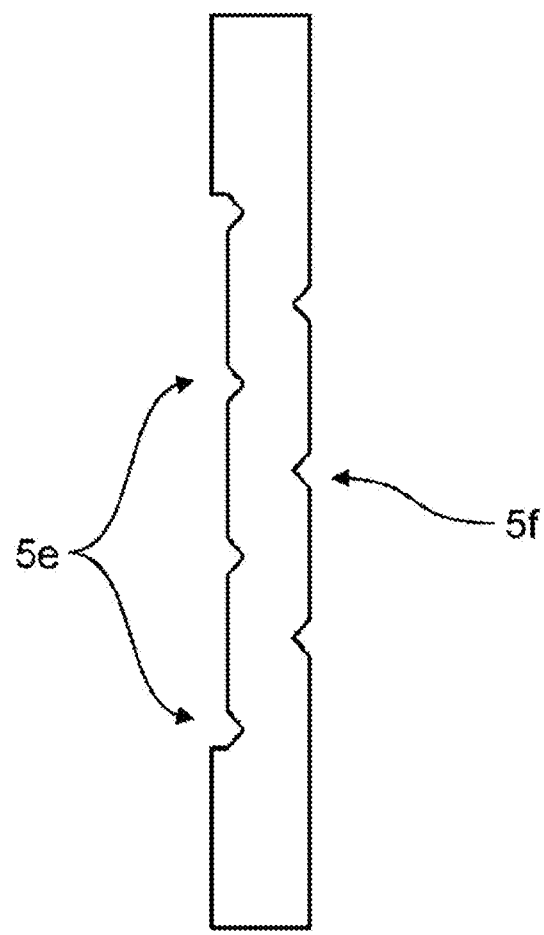
FIG. 7B is a front view illustrating a coil according to Modification Example 1.
Figure 7B:
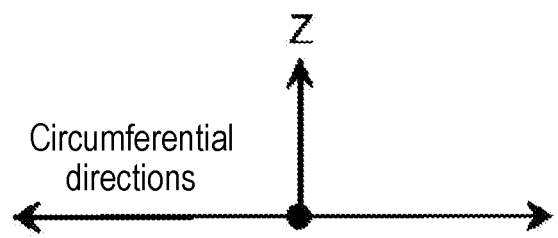
Figure 7C:
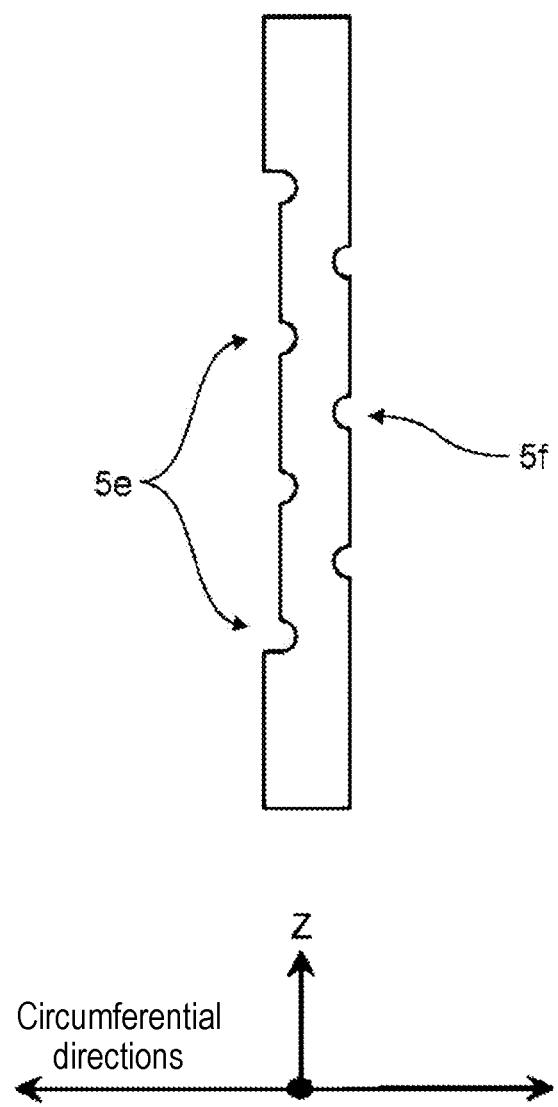
FIG. 7C is a front view illustrating another coil according to Modification Example 1.

FIG. 7A is a front view illustrating coil 5 according to the exemplary embodiment. FIG. 7A is the front view of coil 5 illustrated in FIGS. 2 and 3 when viewed from the inside to the outside in the radial directions of the coil. FIGS. 7B and 7C are front views of coil 5 according to Modification Example 1 when viewed from the inside to the outside in the radial directions of the coil, for purpose of comparison. FIG. 7B is the front view illustrating coil 5 according to Modification Example 1. FIG. 7C is the front view illustrating another coil 5 according to Modification Example 1. For convenience of description, in FIG. 7A, only an n-th turn of the conductive wire wound n turns, i.e., an innermost turn in the radial directions of the coil, is illustrated. The conductive wire in other turns than the n-th turn and extended portion 5c are omitted. FIGS. 7B and 7C illustrate only one axial portion of the conductive wire, which is provided with recesses that are cut out. The conductive wire in other turns than the n-th turn and extended portions 5c and 5d are omitted.

Coil 5 illustrated in FIGS. 7A, 7B, and 7C is provided with recesses 5e respectively representing cut-out portions (deformed portions) provided on the inside of the coil in each of the teeth, and recesses 5f respectively representing cut-out portions (deformed portions) provided on the outside of the coil in each of the teeth.

A shape of each of the recesses in FIG. 7A is substantially rectangular. The shape of each of the recesses may be substantially triangular, as illustrated in FIG. 7B, substantially semicircular, as illustrated in FIG. 7C, or trapezoid. The recesses are cut out in the circumferential directions of the coil.

There are a plurality of the recesses in FIGS. 7A to 7C. In that case, it is preferable that the recesses are provided in both of the circumferential directions of the coil. It is preferable that a number of recesses 5e provided on the inside in the radial directions of the coil be equal to or greater by one than a number of recesses 5f provided on the outside of the conductive wire. To provide such a recess as illustrated in FIGS. 7A to 7C one and only, it is preferable that recess 5e be provided on the inside of the spirally formed conductive wire.

To provide in plural such recesses as illustrated in FIGS. 7A to 7C, it is preferable that recesses 5e provided on the inside of the conductive wire and recesses 5f provided on the outside of the conductive wire be provided in both of the circumferential directions of the coil, but be not provided at positions identical to each other in the Z-axis direction.

As described above, it is preferable that recesses on the inside of coil 5 be equal to or greater in number than recesses on the outside of coil 5.

Furthermore, in the deformed portions, it is preferable that recesses on the inside of the conductive wire and the recesses on the outside of the conductive wire be not provided at positions identical to each other in the Z-axis direction.

In Modification Example 1, the number of turns of coil 5 has been specified to 10. However, the number of turns is not particularly limited to this number. Another number may be applied.

(Modification Example 2)

Figure 8A:
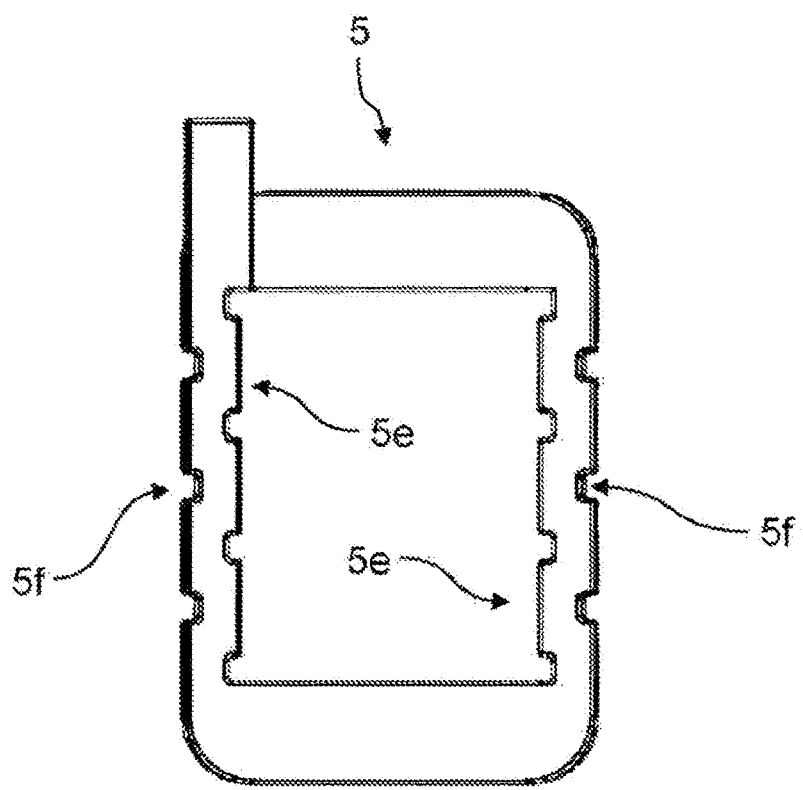
FIG. 8A is a front view illustrating the coil according to the exemplary embodiment.
Figure 8A:
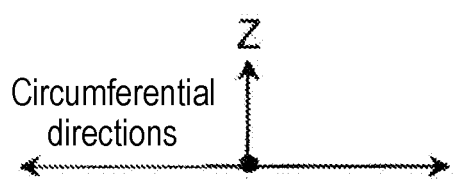
Figure 8B:
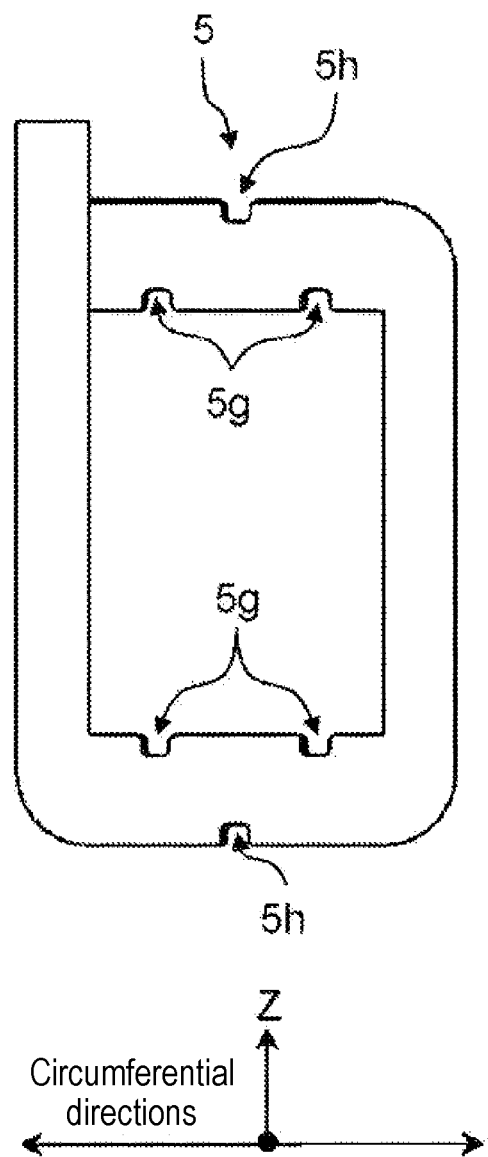
FIG. 8B is a front view illustrating a coil according to Modification example 2.
Figure 8C:
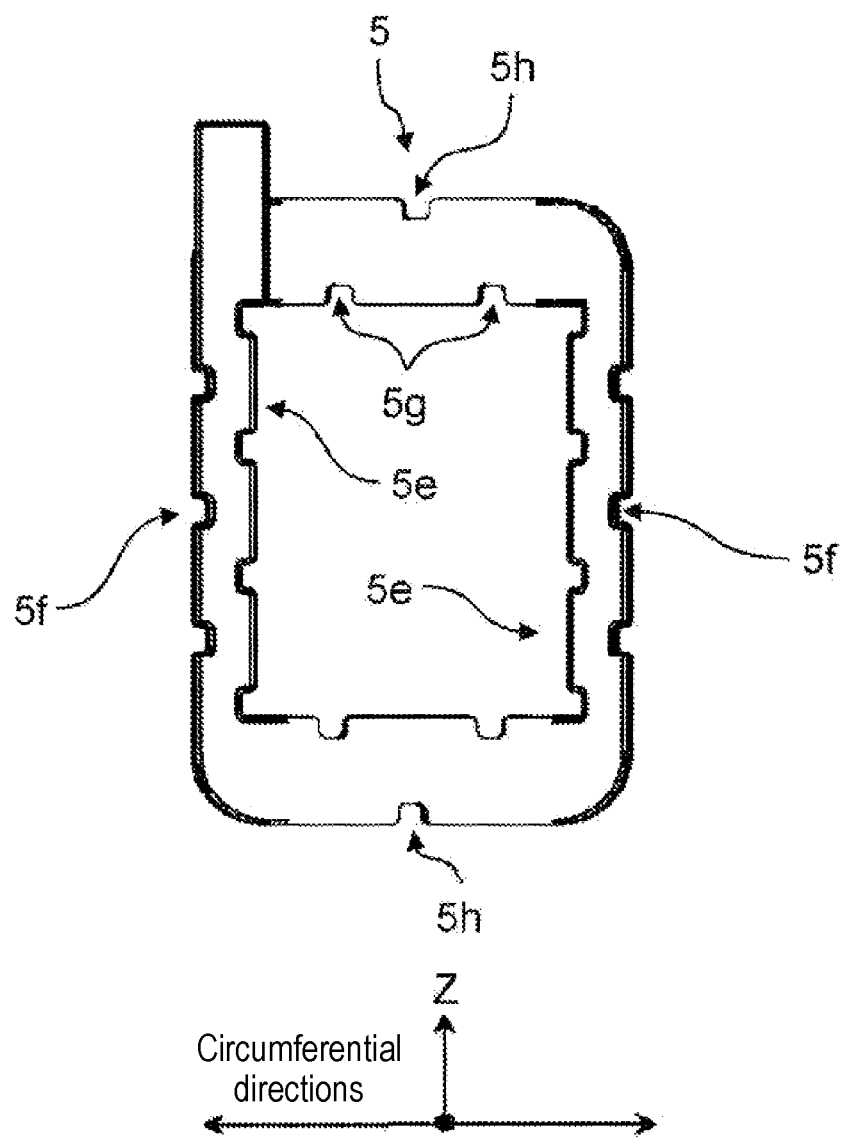
FIG. 8C is a front view illustrating another coil according to Modification example 2.

FIG. 8A is a front view illustrating the coil according to the exemplary embodiment. FIG. 8A is the front view of coil 5 illustrated in FIGS. 2 and 3 when viewed from the inside to the outside in the radial directions of the coil. FIGS. 8B and 8C are front views of coil 5 according to Modification Example 2 when viewed from the inside to the outside in the radial directions of the coil, for purpose of comparison. FIG. 8B is the front view illustrating the coil according to Modification Example 2. FIG. 8C is the front view illustrating another coil according to Modification Example 2. For convenience of description, in FIGS. 8A, 8B, and 8C, only an n-th turn of the conductive wire wound n turns, i.e., an innermost turn, is illustrated. The conductive wire in other turns than the n-th turn and extended portion 5c are omitted.

The recesses that are cut out on coil 5 illustrated in FIGS. 8A, 2 and 3 are arranged only in the Z-axis direction of the conductive wire. In FIGS. 8B and 8C illustrating the present modification example, the recesses are provided on a top portion of the coil and a bottom portion of the coil. In this case, the recesses that are cut out on the inside of the coil are illustrated as 5g, whereas the recesses that are cut out on the outside of the coil are illustrated as 5h.

That is, coil 5 illustrated in FIGS. 8B and 8C is provided with recesses 5g respectively representing cut-out portions (deformed portions) on the inside of the coil at the top and bottom portions of each of the teeth and recesses 5h respectively representing cutout portions (deformed portions) on the outside of the coil at the top and bottom portions of each of the teeth.

Recesses 5e, recesses 5f, recesses 5g, and recesses 5h may all be provided, or may be partially provided on any of sides. FIG. 8C illustrates an example in which recesses 5e, recesses 5f, recesses 5g, and recesses 5h are provided on all the sides. Recesses 5e, recesses 5f, recesses 5g, and recesses 5h are not limited in position.

In the present modification example, the number of the recesses has been specified to 5 or 3 on each of the sides. However, the number of the recesses is not particularly limited to this number. Another number may be applied.

(Modification Example 3)

Figure 9A:
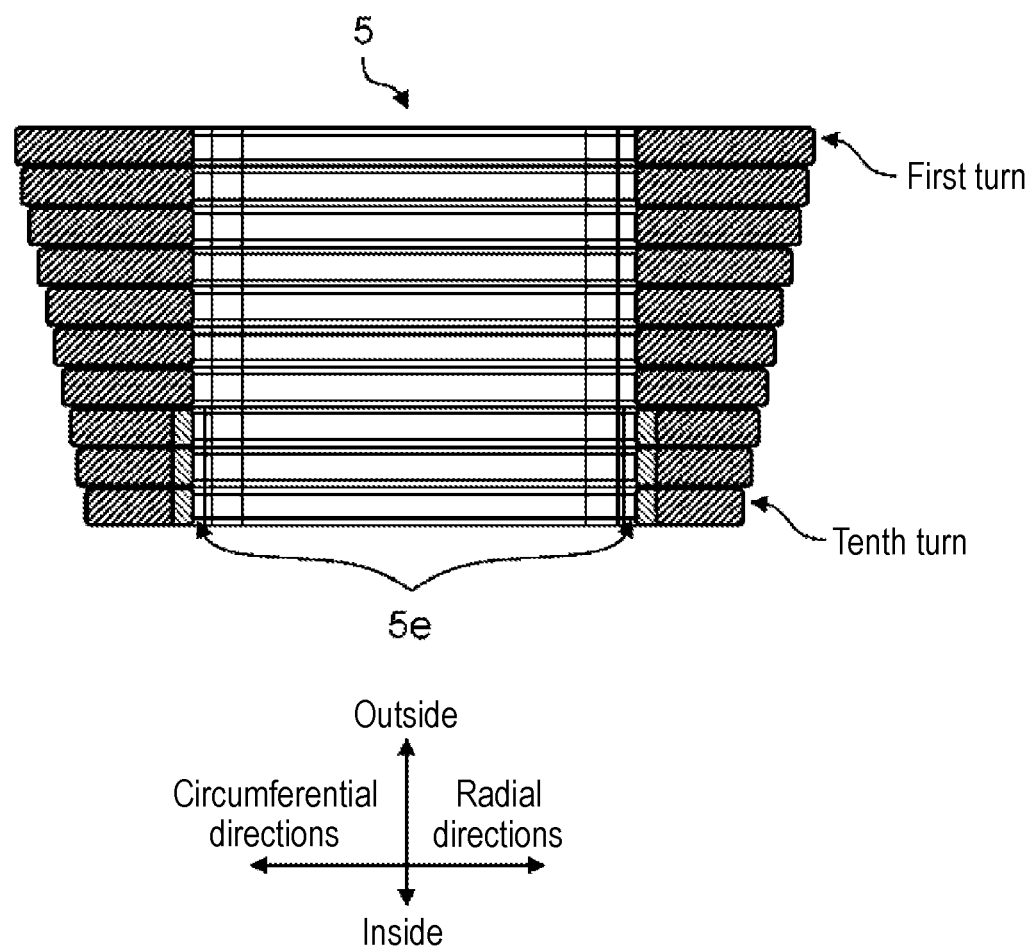
FIG. 9A is a cross-sectional view illustrating the coil according to the exemplary embodiment.
Figure 9B:
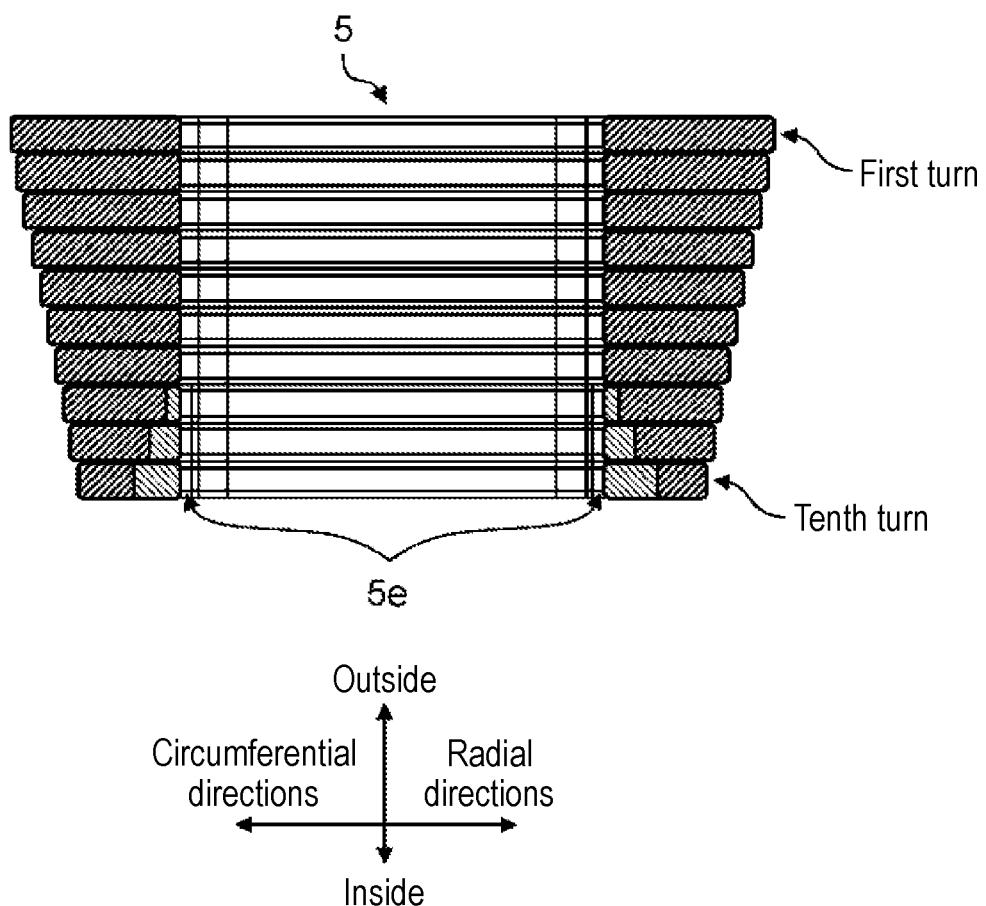
FIG. 9B is a cross-sectional view illustrating a coil according to Modification example 3.

FIG. 9A is a cross-sectional view illustrating coil 5 according to the exemplary embodiment. FIG. 9A illustrates a cross section of coil 5 taken along line 1C-1C illustrated in FIG. 1B, as well as illustrates a cross section taken along line 1C-1C illustrated in FIG. 3 and viewed in the Z-axis direction. FIG. 9B has been illustrated for purpose of comparison with coil 5 according to the present modification example. FIG. 9B is a cross-sectional view illustrating coil 5 according to Modification Example 3. Note that, for convenience of description, in FIGS. 9A and 9B, illustration of tooth portions in the coil is omitted.

Recesses 5e illustrated in FIG. 9A are provided on eighth to tenth turns. Degrees of cut out of the recesses are all identical to each other in size. In FIG. 9B illustrating the present modification example, degrees of cut out of recesses 5e on the conductive wire are not identical to each other. A degree of cut out on the conductive wire increases toward inside in the radial directions. Since an eddy current generated on the inside in the radial directions of the coil tends to be greater than an eddy current generated on the outside in the radial directions of the coil, how much recesses 5e are cut put has been made different in size. Furthermore, as illustrated in FIG. 6, from the eighth turn to the tenth turn, the conductive wire, at locations where recesses 5e are not cut out, is narrowed in width size in the circumferential directions to form gaps 5j between the teeth.

As described above, it is preferable that, in the deformed portions, a degree of cut out on the conductive wire increases toward inside in the radial directions of coil 5.

As illustrated in FIGS. 9A and 9B, recesses 5e have been provided only on the three turns, i.e., the eighth to tenth turns, on the inside in the radial directions of coil 5. However, the number of turns is not particularly limited to this number. Another number may be applied. In the present modification example, the number of the turns of coil 5 has been specified to 10. However, the number of turns is not particularly limited to this number. Another number may be applied.

Coil 5 can be formed through casting. With this method, a conductive wire having a large cross-sectional area can be easily formed into a spirally wound coil. However, a coil may be formed through another method, instead of casting. For example, a coil may be cut from a solid object of a material such as copper, aluminum, zinc, magnesium, iron, SUS, or brass. Furthermore, for example, a coil may be formed from an integrated member where individually molded components are welded or joined with each other.

INDUSTRIAL APPLICABILITY

The coil according to the present disclosure can reduce generation of eddy currents, and is useful when applied to a motor or a power device, for example.

REFERENCE MARKS IN THE DRAWINGS 1 motor
2 shaft
2a hollow portion
2b through hole
3 rotor
4 stator
5 coil
5a conductive wire
5b insulation film
5c extended portion
5d extended portion
5e recess
5f recess
5g recess
5h recess
5j gap
31 magnet
41 stator core
42 tooth
43 slot
51 bus bar
52 bus bar
53 bus bar
54 bus bar
U11, U22, U32, U41, V12, V21, V31, V42, W11, W22, W32, W41 coil

The invention claimed is:

1. A coil of a conductive wire having a quadrangular cross section, the conductive wire being spirally wound and laminated to have a series of turns including first to n-th turns, where n is an integer of 3 or more, the conductive wire being provided, on at least some of the first to n-th turns in the coil, with deformed portions representing recesses each having a shape different from a shape of another portion of the conductive wire, where, in each of the first and n-th turns respectively lying at both ends of the series of turns, an outer surface lying on a side opposite to a center of the series of turns extends flush along with a plane intersecting the series of turns, wherein the deformed portions are provided, on the conductive wire, in a Z-axis direction representing a direction perpendicular to radial directions and circumferential directions of the coil, with the recesses that are cut out in the circumferential directions of the conductive wire, and wherein, on the deformed portions, the recesses on an inside of the conductive wire and the recesses on an outside of the conductive wire are not provided at positions identical to each other in the Z-axis direction.

2. The coil according to claim 1, wherein the deformed portions are at least provided on the n-th turn.

3. The coil according to claim 1, wherein the deformed portions include the recesses that are cut out, and that are provided on a top side of the coil or a bottom side of the coil.

4. The coil according to claim 1, wherein a number of the recesses on an inside of the coil is equal to or greater than a number of the recesses on an outside of the coil.

5. The coil according to claim 2, wherein, on the deformed portions, a degree of cut out on the conductive wire increases toward inside in the radial directions of the coil.

6. A motor comprising:
a rotor; and
a stator including
a stator core,
teeth protruding from the stator core, and the plurality of the coils according to claim 1, the plurality of the coils being respectively wound around the teeth.

7. A coil of a conductive wire having a quadrangular cross section, the conductive wire being spirally wound and laminated to have a series of turns including first to n-th turns, where n is an integer of 3 or more, the conductive wire being provided, on at least some of the first to n-th turns in the coil, with deformed portions representing recesses each having a shape different from a shape of another portion of the conductive wire, where, in each of the first and n-th turns respectively lying at both ends of the series of turns, an outer surface lying on a side opposite to a center of the series of turns extends flush along with a plane intersecting the series of turns, wherein the deformed portions include the recesses that are cut out, and that are provided on a top side of the coil or a bottom side of the coil, and wherein, on the deformed portions, the recesses on an inside of the conductive wire and the recesses on an outside of the conductive wire are not provided at positions identical to each other in a Z-axis direction.

8. The coil according to claim 7, wherein the deformed portions are at least provided on the n-th turn.

9. The coil according to claim 7, wherein a number of the recesses on an inside of the coil is equal to or greater than a number of the recesses on an outside of the coil.

10. The coil according to claim 8, wherein, on the deformed portions, a degree of cut out on the conductive wire increases toward inside in the radial directions of the coil.

11. A motor comprising:

a rotor; and a stator including a stator core, teeth protruding from the stator core, and the plurality of the coils according to claim 7, the plurality of the coils being respectively wound around the teeth.

* * * * *